No. 757,205. PATENTED APR. 12, 1904.
J. W. KORFHAGE.
GOLD SEPARATOR.
APPLICATION FILED JULY 29, 1903.
NO MODEL. 2 SHEETS—SHEET 1.
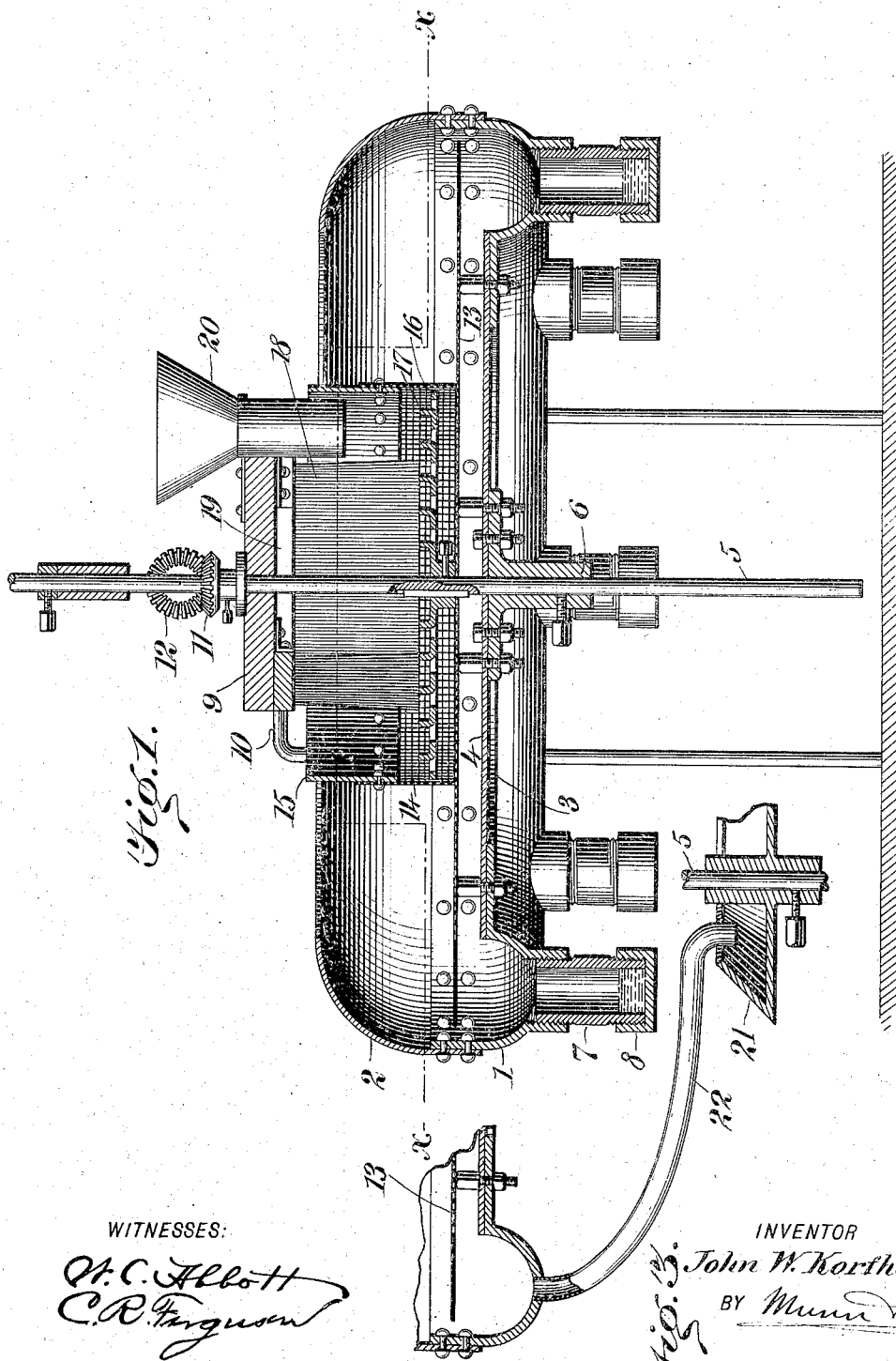
WITNESSES:
INVENTOR
John W. Korfhage
BY
ATTORNEYS

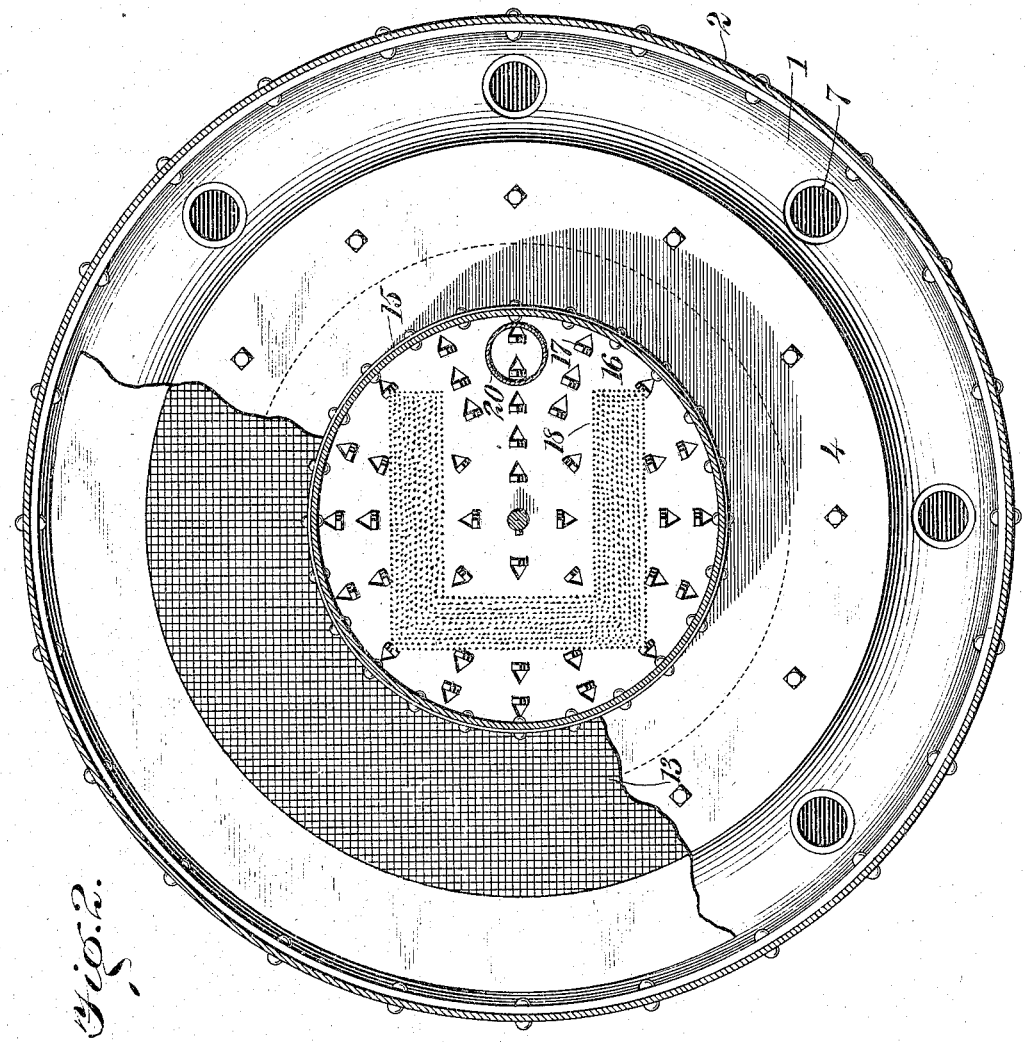

No. 757,205.

Patented April 12, 1904.

UNITED STATES PATENT OFFICE.

JOHN W. KORFHAGE, OF DENVER, COLORADO.

GOLD-SEPARATOR.

SPECIFICATION forming part of Letters Patent No. 757,205, dated April 12, 1904.

Application filed July 29, 1903. Serial No. 167,432. (No model.)

*To all whom it may concern:*

Be it known that I, JOHN W. KORFHAGE, a citizen of the United States, and a resident of Denver, in the county of Denver and State of Colorado, have invented a new and Improved Gold-Separator, of which the following is a full, clear, and exact description.

This invention relates to improvements in machines for separating and amalgamating free-milling gold from gravel, clay, and from pulp. In placer-mining I find clay containing gold and also clay with gravel containing gold, and great difficulty is found in separating the metal from the sticky clays. It is therefore an object of my invention to produce a device particularly adapted to work under such conditions and make a thorough separation.

I will describe a gold-separator embodying my invention and then point out the novel features in the appended claims.

Reference is to be had to the drawings forming a part of this specification, in which similar characters of reference indicate corresponding parts in all the figures.

Figure 1 is a sectional elevation of a gold-separator embodying my invention. Fig. 2 is a section on the line *x x* of Fig. 1, and Fig. 3 shows a slight modification in a portion of the machine.

Referring to the drawings, 1 designates an annular trap or trough, here shown as transversely curved, the inner wall being somewhat lower than the outer wall, and to this outer wall a cover-section 2, which forms a riffle, is bolted, this riffle being curved inward. The trap or trough 1 has an annular flange 3 at its inner side, which is bolted to a plate 4, attached to a vertical shaft 5, said plate forming the bottom of the machine. As here shown, this plate 4 has a hub portion 6, through which the shaft passes, and a bolt secures the hub to the shaft. Depending from the trap or trough and communicating therewith at intervals are tubes 7, which form amalgamating-pockets, these tubes being designed to hold mercury. The bottom 8 of each tube is removably connected thereto, as here shown, by screw-threads. The upper portion of the shaft 5 has a bearing through a platform 9, supported on trusses 10, and secured to the shaft above the platform is a miter-gear 11, meshing with a miter-gear 12, attached to an operating-shaft, and by means of this gearing the machine may rotate in either direction.

Extended over the bottom or plate 4 is a screen 13, and the said screen is raised somewhat above said bottom or plate. The meshes terminate at a point over the inner wall of the trap or trough, and a portion of the screen-plate extended over the trough is imperforate and terminates a short distance from the outer wall of the trough.

Supported above the screen is a hopper or receiver having an open-mesh lower portion 14 and a closed or ring-like portion 15. Secured to the shaft within the hopper or receiver is a grinding-plate 16, which is perforated and has upwardly-turned teeth 17, which engage with the ends of steel or similar brush material 18, the brush material being attached, as here shown, to a three-sided frame 19, bolted to the under side of the platform 9.

This machine when in operation is designed to be submerged in water—that is, in a brook or in a sluice.

In the operation the clay or clay and gravel containing gold is to be passed into the receiver through the fixed funnel 20. The pockets 7 are to be filled with mercury and the pan or machine placed in the water from four to eight inches below the surface. When the machine is set in rotation, the material will be thoroughly ground or disintegrated through the action of the brush and the teeth 17. During this motion it is obvious that a thorough washing will take place, freeing all the gold from the clays or other material, and as the gold becomes free it settles down through the screen and is forced outward on the plate or bottom 4 to the trap or trough by centrifugal action. Here the gold becomes embedded in the sand, which soon collects in the trap, and the constant rotation of the pan in either direction horizontally keeps the material on the screen-plate and in the trap agitated, and changing its position the gold or heavier particles settle to the bottom of the trap and pass into the mercury-pockets, where the same is amalgamated. The sand and lighter material as it accumulates is forced up through the space between the screen and the outer wall of the trap and thence through the opening of the cover or riffle 2.

For stamp-mill, pulp, and free-milling placer gravels I dispense with the use of the grinding-plate and brush. After washing, the amalgam may be removed from the pockets when the bottom-closures are taken out. In large machines I attach a mercury-pan to the lower end of the shaft 5.

In Fig. 3 I have shown a mercury-pan 21, which has a hub-like portion through which the shaft passes, and the wall of the pan is inclined inward and upward. This forms a practically tight compartment for mercury around the hub; but the top is open to admit pipes 22, leading from the trap, for conveying the gold concentrates to the mercury, and the ends of these pipes are extended into the mercury sufficiently to force the gold concentrates into and through the mercury, and thus the gold will remain while the sand and lighter material is forced to the top and washed off as it accumulates. I may use this mercury-pan 21 in connection with the mercury-pockets or I may employ the pan alone.

Having thus described my invention, I claim as new and desire to secure by Letters Patent—

1. A gold-separator comprising an annular trough, a rotary shaft on which said trough is mounted, a riffle-plate extended upward from the outer wall of the trough and curved inward, a screen arranged horizontally in the separator and having an imperforate portion extended partly across the trough, and mercury-containers communicating with said trough or trap.

2. A gold-separator comprising an annular trough, a plate to which said trough is connected, a shaft on which the said plate is mounted, a riffle-plate extended upward and curved inward from the outer wall of the trough or trap, a screen-plate extended horizontally in the machine above said bottom plate, the said screen-plate having an imperforate portion extended over the trap or trough and terminating inward of the outer wall thereof, mercury-containers communicating with the trough or trap, and grinding devices arranged over the screen.

3. A gold-separator comprising an annular trough or trap mounted to rotate, mercury-pockets carried by said trough or trap, a screen extended through the machine and having an imperforate portion extended over the trap or trough and terminating inward of the outer wall thereof, a grinding-plate mounted on the shaft above said screen, a receiver or hopper having a perforated lower portion surrounding said plate, and a metallic brush coacting with the grinding-plate.

4. A gold-separator comprising an annular trough or trap, tubes depending therefrom and communicating with the interior thereof, bottoms for said tubes having screw-thread engagements therewith, a rotary shaft carrying the trough or trap, a screen extended horizontally in the machine and having an imperforate portion projected over the trough or trap, a curved riffle-plate extended upward from the outer wall of the trough or trap, a perforated plate having teeth secured to the shaft above said screen, a metallic brush supported over said plate, and a receiver surrounding the plate and having a perforated lower portion.

5. A gold-separator, comprising an annular trough, means for imparting rotary motion to the trough, a screen-plate having an imperforate portion extended over the trough and terminating inward of the outer edge thereof, and a mercury-container arranged below the trough and communicating therewith.

In testimony whereof I have signed my name to this specification in the presence of two subscribing witnesses.

JOHN W. KORFHAGE.

Witnesses:
L. F. MEYERS,
WM. MCKINNEY.